United States Patent
Cudak et al.

(10) Patent No.: US 9,779,623 B2
(45) Date of Patent: Oct. 3, 2017

(54) COMMUNICATION OF ALERTS TO VEHICLES BASED ON VEHICLE MOVEMENT

(71) Applicant: Lenovo Enterprise Solutions (Singapore) PTE. LTD, Singapore (SG)

(72) Inventors: Gary D. Cudak, Wake Forest, NC (US); Christopher J. Hardee, Raleigh, NC (US); Sarbajit K. Rakshit, Kolkata (IN)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 155 days.

(21) Appl. No.: 14/322,874

(22) Filed: Jul. 2, 2014

(65) Prior Publication Data

US 2016/0005315 A1    Jan. 7, 2016

(51) Int. Cl.
*B60Q 1/00* (2006.01)
*G08G 1/0967* (2006.01)
*G08G 1/16* (2006.01)
*B60C 5/00* (2006.01)

(52) U.S. Cl.
CPC ......... *G08G 1/096791* (2013.01); *B60C 5/00* (2013.01); *G08G 1/162* (2013.01); *G08G 1/166* (2013.01)

(58) Field of Classification Search
None
See application file for complete search history.

(56) References Cited

U.S. PATENT DOCUMENTS

| 4,403,208 A | 9/1983 | Hodgson et al. |
| 8,565,734 B2 | 10/2013 | Himmelstein |
| 8,854,198 B2* | 10/2014 | Tengler .............. G08G 1/0965 340/435 |
| 2003/0030552 A1* | 2/2003 | Tonkin ................. B60Q 1/444 340/435 |
| 2007/0164896 A1* | 7/2007 | Suzuki .................. G01S 7/006 342/70 |
| 2008/0074286 A1* | 3/2008 | Gill ..................... G08G 1/0965 340/902 |

(Continued)

FOREIGN PATENT DOCUMENTS

JP    2003182474 A    7/2003

OTHER PUBLICATIONS

Knight, Will, "The Internet of Cars is Approaching a Crossroads; Wireless vehicle networks could make driving safer and more efficient, but the cost of deployment will be significant", MIT Technology Review (2014) vt13.05.10.

*Primary Examiner* — Julie Lieu
(74) *Attorney, Agent, or Firm* — Olive Law Group, PLLC

(57) ABSTRACT

Systems and methods for communicating alerts to vehicles based on vehicle movement are disclosed. According to an aspect, a method includes determining movement of one or both of first and second vehicles. The method also includes analyzing the determined movement based on a predetermined criteria. Further, the method includes receiving user input for vehicular communication of an alert. The method also includes communicating an alert to the second vehicle based on the analysis in response to receiving the user input.

10 Claims, 4 Drawing Sheets

(56) References Cited

U.S. PATENT DOCUMENTS

| | | | |
|---|---|---|---|
| 2008/0186206 A1* | 8/2008 | Reumerman | G08G 1/161 340/902 |
| 2009/0043506 A1* | 2/2009 | Breed | G08G 1/161 701/472 |
| 2009/0207043 A1* | 8/2009 | Shaffer | G08G 1/161 340/903 |
| 2014/0005884 A1 | 1/2014 | Hampiholi | |
| 2014/0118130 A1* | 5/2014 | Chang | G08G 1/163 340/435 |
| 2015/0054659 A1* | 2/2015 | Chen | G08G 1/096716 340/905 |
| 2015/0061851 A1* | 3/2015 | Tomita | B60Q 9/008 340/436 |
| 2015/0254977 A1* | 9/2015 | Grabow | G08G 1/0141 340/903 |
| 2016/0023599 A1* | 1/2016 | Jo | B60Q 9/008 340/903 |
| 2016/0152233 A1* | 6/2016 | Fung | B60K 28/06 701/41 |

\* cited by examiner

COMMUNICATION OF ALERTS TO VEHICLES BASED ON VEHICLE MOVEMENT

TECHNICAL FIELD

The present invention is related to communication systems, and more specifically, to communication of alerts to vehicles based on vehicle movement.

BACKGROUND

Communication systems have been developed for allowing vehicle operators to communicate with other vehicle operators and nearby persons. Such communication may be needed to warn others of the approach of a vehicle or of its presence. In this way, the recipient may provide clearance or otherwise take action. Most commonly, vehicle horns are used for these communications. In many countries, vehicle horns are required in automobiles, motorcycles, ships, and trains.

A shortcoming of vehicle horns is that they are not directional. Thus, some receiving the horn sound may not be intended recipients. Another shortcoming is that the intended recipient may not hear the horn due to distractions such as other road noise or music volume. Yet another shortcoming is that the intended recipient may not recognize that the communication is intended for him or her. As a result, an accident or another unintended consequence may occur. For at least these reasons, it is desired to provide improved systems and techniques for communicating between vehicle operators.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for communicating alerts to vehicles based on vehicle movement. According to an aspect, a method includes determining movement of one or both of first and second vehicles. The method also includes analyzing the determined movement based on a predetermined criteria. Further, the method includes receiving user input for vehicular communication of an alert. The method also includes communicating an alert to the second vehicle based on the analysis in response to receiving the user input.

According to another aspect, a method may be implemented at a first vehicle and includes receiving an alert from a second vehicle. The method also includes analyzing movement of the first vehicle and the second vehicle. Further, the method includes determining whether the first vehicle is the intended recipient of the alert based on the analyzed movement. The method also includes using a user interface of the first vehicle to present notification of the alert in response to determining that the first vehicle is the intended recipient.

According to yet another aspect, a method may be implemented at a first vehicle. The method includes determining a behavior associated with one of the first vehicle and a second vehicle. Further, the method includes analyzing the behavior. The method includes receiving user input for vehicular communication of an alert. Further, the method includes communicating an alert to the second vehicle based on the analysis in response to receiving the user input.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, a "user interface" is generally a system by which users interact with a computing device. A user interface can include an input for allowing users to manipulate a computing device, and can include an output, such as, but not limited to, a display, for allowing the computing device to present information and/or data, indicate the effects of the user's manipulation, etc. The display may comprise a touchscreen display for enabling the input of information and the output of information. An example of a user interface on a computing device includes a graphical user interface (GUI) that allows users to interact with programs in more ways than typing.

Figure 1:
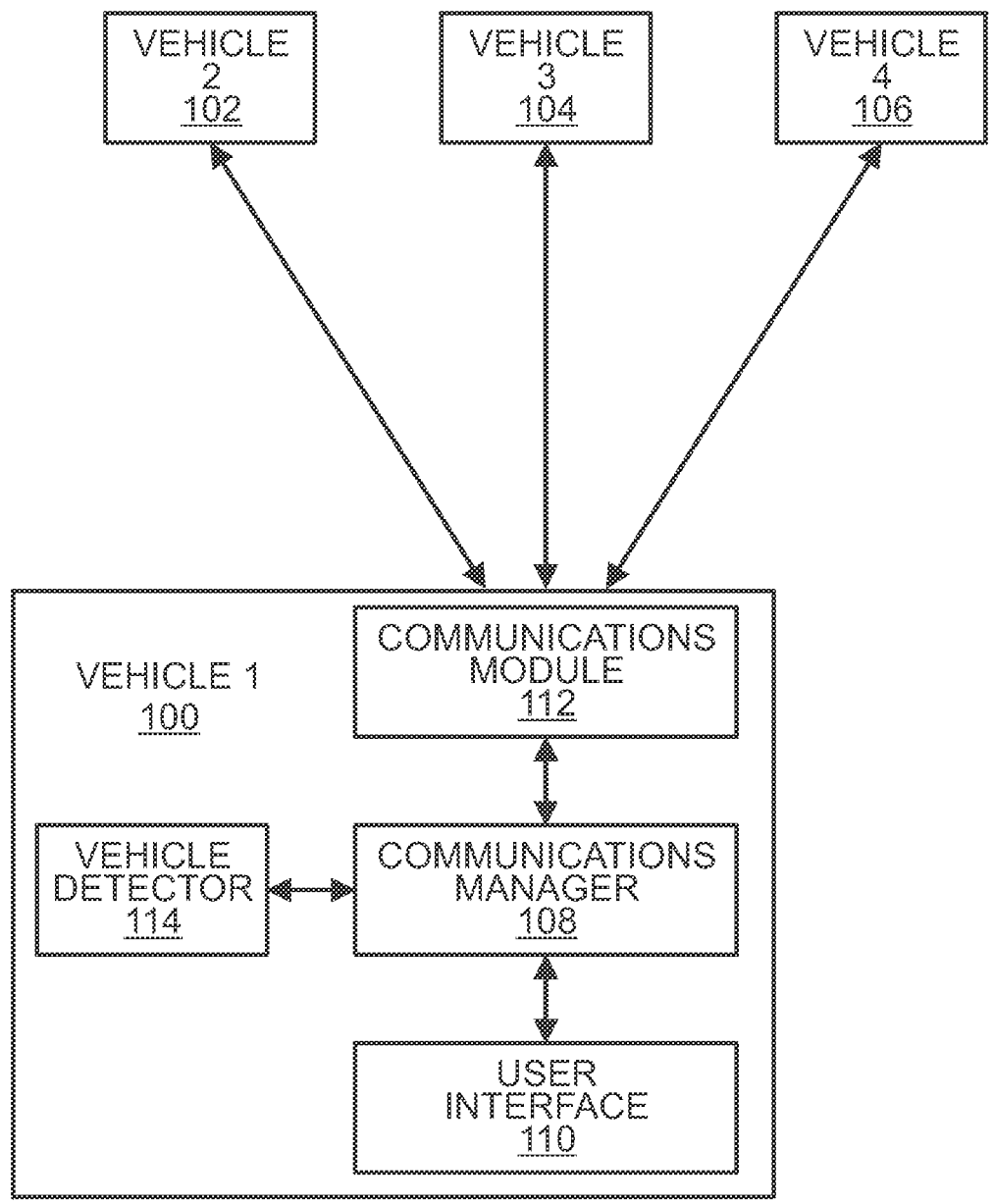
FIG. 1 is a system for communicating alerts to vehicles based on vehicle movement in accordance with embodiments of the present subject matter.

The present invention is now described in more detail. For example, FIG. 1 illustrates a system for communicating alerts to vehicles based on vehicle movement in accordance with embodiments of the present subject matter. Referring to FIG. 1, the vehicles 100, 102, 104, and 106 may be automobiles and/or motorcycles operating on one or more roads or highways. The vehicles may be configured for communicating alerts among each other in accordance with embodiments of the present subject matter. Detail components of vehicle 100 for implementing functionality described herein are shown in FIG. 1. It should be understood that vehicles 102, 104, and 106 may include the same or similar components.

Now turning to vehicle 100, the vehicle may include a communications manager 108, a user interface 110, a communications module 112, and a vehicle detector 114. The communications manager 108 may be a computing device having functionality for determining movement of the vehicle 100 and/or one or more other vehicles, for analyzing the determined movement based on a predetermined criteria, for receiving user input for vehicular communication of an alert, and for communicating the alert to the other vehicle(s) based on the analysis. The communications manager 108 may be a computing device including hardware, software, firmware, or combinations thereof. For example, the communications manager 108 may include one or more processors and memory.

The communications manager 108 may be operatively connected to the user interface 110. For example, an operator of the vehicle 100 may input instructions into the user interface 110 for input to the communications manager 108 in accordance with the present disclosure. As an example, the user interface 110 may include a touchscreen display, a speaker, a keypad, button, or other component for receipt of user input. The user interface 110 may also include components for presentation of information (e.g., text, images, video, or sound) to the operator of the vehicle 100. As an example, a display may present graphics for indicating an alert from another vehicle. In another example, the display may present graphics for spatially representing the vehicles 100, 102, 104, and 106 with respect to one another. The spatial representation may be presented along with information for indicating the origin of a received alert. In another example, the operator may interact with the display for indicating one or more of the vehicles to receive an alert.

The communications manager 108 may also be operatively connected to the communications module 112. The communications module 112 may include suitable electronic components for communicating with other vehicles, such as vehicles 102, 104, and 106. For example, another vehicle may also include a communications module operable to communicate with the communications module 112. The communications module 112 may be suitably configured for wireless communication with other communications modules. As an example, the communications modules may communicate directly with one another via a suitable wireless communication technique. The communications modules may send alerts or other data in accordance with embodiments of the present invention. The communications modules may alternatively communicate among one another via a suitable wireless network.

The vehicle detector 114 may be configured to detect one or more other vehicles in proximity to the vehicle 100. For example, the vehicle detector 114 may detect the position and motion of vehicles 102, 104, and 106. More specifically, the vehicle detector 114 may determine a distance and trajectory of the vehicle 102. The vehicle detector may be a motion detector, an image capture device (e.g., still or video camera), or other suitable equipment for detecting other vehicles. The vehicle detector 114 may continuously or periodically gather data about the surroundings of the vehicle 100. Upon detection of one or more other vehicles, the vehicle detector 114 may suitably process the data about the other vehicle(s) and communicate the processed data to the communications manager 108. The data received at the communications manager 108 may include, but is not limited to, a speed, direction, location, or the like of one or more other vehicles.

Figure 2:
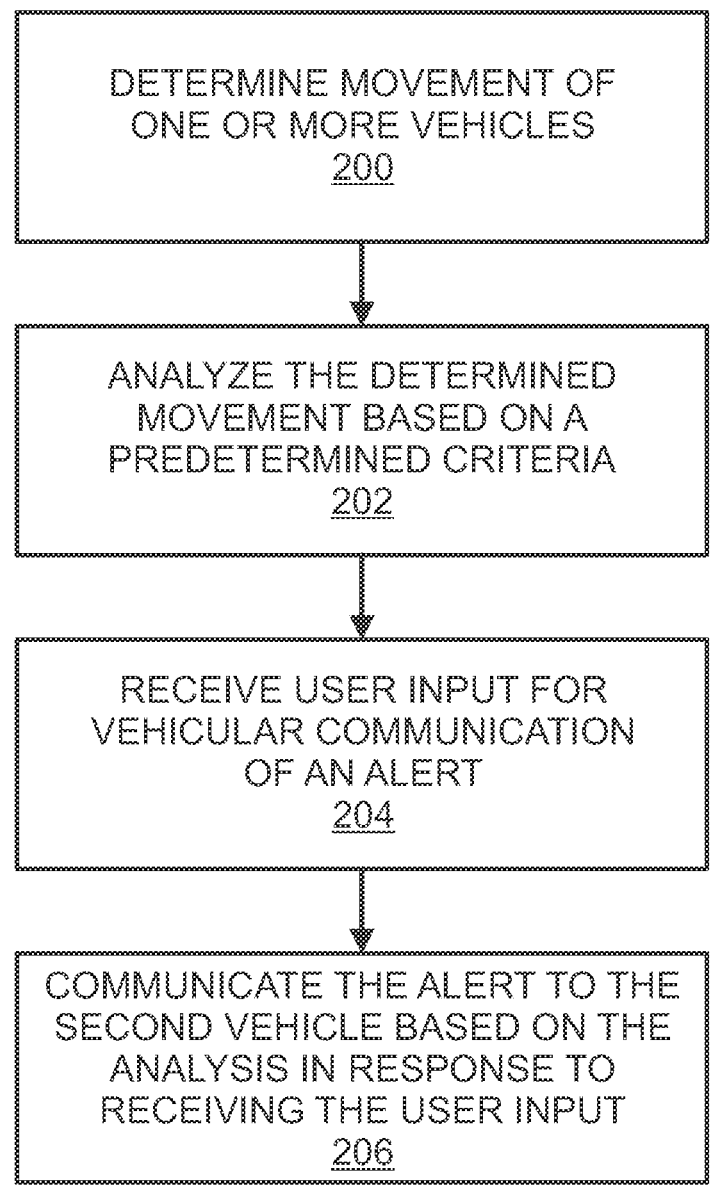
FIG. 2 is a flowchart of an example method for communicating an alert to a vehicle based on vehicle movement in accordance with embodiments of the present subject matter.

FIG. 2 illustrates a flowchart of an example method for communicating an alert to a vehicle based on vehicle movement in accordance with embodiments of the present subject matter. The method of FIG. 2 is described as being implemented by the vehicle 100 shown in FIG. 1, although it should be understood that the method may be implemented by any other suitably configured vehicle 100. For example, the method may be implemented by the communications manager 108 or any suitably configured computing device.

Referring to FIG. 2, the method includes determining 200 movement of one or more vehicles. For example, the vehicle detector 114 may continuously monitor and capture data associated the surroundings of the vehicle 100 while the vehicle 100 is operation (e.g., traveling on a highway or street). In an example, the vehicle detector 114 may be one or more motion detectors configured to detect the movement of other vehicles and their position with respect to the vehicle 100. In another example, the vehicle detector 114 may be one or more cameras configured to capture video of the surroundings of the vehicle 100. In another example, the vehicle detector 114 may include a combination of motion detectors and cameras. The vehicle detector 114 may be suitably attached on an exterior of the vehicle 100 for capturing data about the vehicle's surroundings. The captured data may be communicated to and suitably stored by the communications manager 108.

Further regarding determining 200 vehicle movement, the vehicle detector 114 may be configured to determine the movement of the vehicle 100. For example, the vehicle detector 114 may include one or more sensors to determine the speed and direction of movement of the vehicle 100. In another example, the vehicle detector 114 may include one or more cameras, one or more motion detectors, or combinations thereof for determining movement of the vehicle 100 based on captured data of the surroundings of the vehicle 100.

The method of FIG. 2 includes analyzing 202 the determined movement based on a predetermined criteria. Continuing the aforementioned example, the communications manager 108 may receive data captured by the vehicle detector 114 about the movement of one or more vehicles (e.g., vehicles 100, 102, 104, and/or 106). Based on the data, the vehicle detector 114 may predict a distance between vehicles, such as a distance between the vehicle 100 and vehicle 102. The vehicle detector 114 may predict the distance based on a current direction, speed, and location of vehicles 100 and 102, for example. In an example, the vehicle detector 114 may control the communications module 112 to communicate an alert to the vehicle 102 in response to the predicted distance being within a predetermined distance. In another example, the vehicle detector 114 may control the user interface 110 to present an alert to the operator of the vehicle 100 in response to the predicted distance being within a predetermined distance.

The method of FIG. 2 includes receiving 204 user input for vehicular communication of an alert. Continuing the aforementioned example, the user interface 110 may receive user input for vehicular communication of an alert. In an example, the user interface 110 may include a horn interface on a steering wheel of an automobile for receipt of user input for warning another vehicle or communicating a notification to the other vehicle. In another example, the operator of the vehicle 100 may suitably interact with the user interface 100 for inputting a request to communicate an alert to another vehicle.

The method of FIG. 2 includes communicating 206 the alert to the second vehicle based on the analysis in response to receiving the user input. Continuing the aforementioned example, the communications manager 108 may control the communications module 112 to communicate the alert to one or more of vehicles 102, 104, and 106 in response to receipt of the user input. For example, the communications manager 108 may identify another vehicle that is the intended recipient of the alert by the operator of the vehicle 100 based on the analysis. The vehicle may be identified in response to determining that it is located within a predetermined distance or position with respect to the vehicle 100. For example, if the other vehicle is stopped and directly in front of the vehicle 100, the communications manager 108 may determine that this vehicle is the intended recipient. In response to receipt the user input, the communications module 112 may be controlled to wirelessly communicate the alert to the identified vehicle. Upon receipt of the communication, the recipient vehicle may sound an alert or otherwise present the alert or notification to the recipient vehicle's operator.

Figure 3:
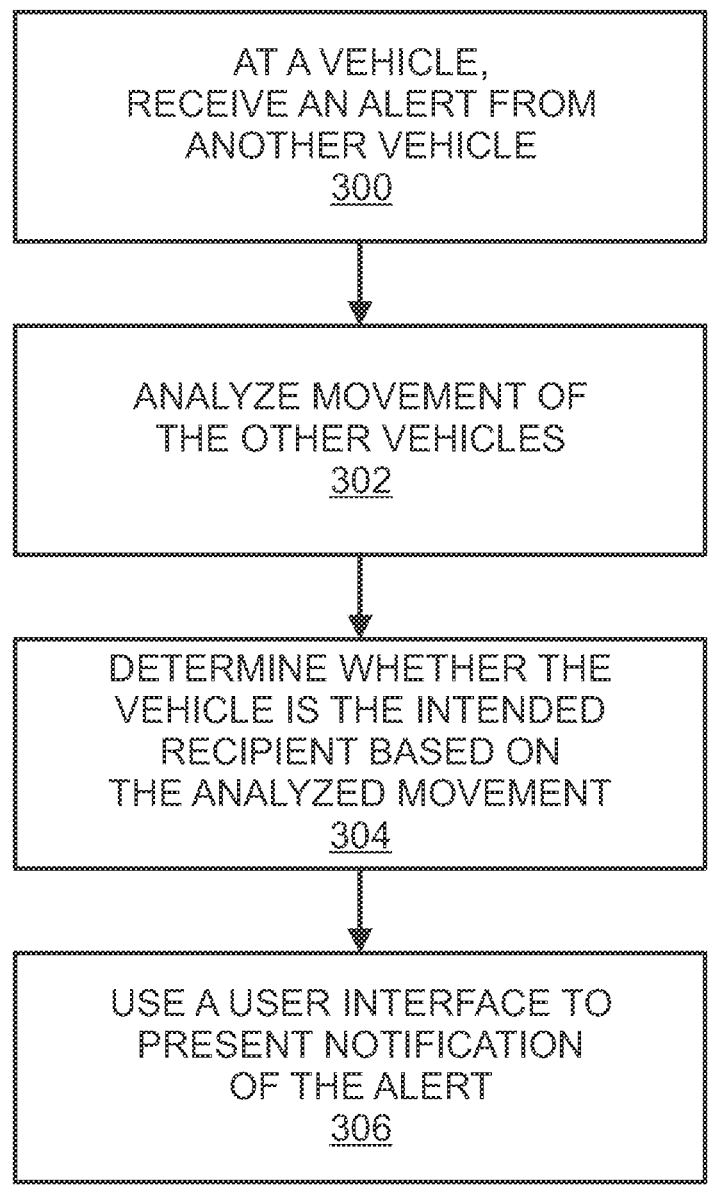
FIG. 3 is a flowchart of an example method for communicating alerts to vehicles based on vehicle movement in accordance with embodiments of the present subject matter.

FIG. 3 illustrates a flowchart of an example method for communicating alerts to vehicles based on vehicle movement in accordance with embodiments of the present subject matter. The method of FIG. 3 is described as being implemented by the vehicle 100 shown in FIG. 1, although it should be understood that the method may be implemented by any other suitably configured vehicle 100. For example, the method may be implemented by the communications manager 108 or any suitably configured computing device.

Referring to FIG. 3, the method includes receiving 300, at a first vehicle, an alert from a second vehicle. For example, the communications module 112 of the vehicle 100 shown in FIG. 1 may receive an alert communicated from vehicle 104. The alert may identify the sender, vehicle 104.

The method of FIG. 3 includes analyzing 302 movement of the first vehicle and the second vehicle. Continuing the aforementioned example, the communications manager 108 may determine receipt of the alert and analyze movement of the vehicles 100 and 104 in response to receipt of the alert. The analysis may be determined based on data captured by the vehicle detector 114 such as, but not limited to, a location, speed, and/or direction of one or both of vehicles 100 and 104. In addition, the analysis may include movement data about a third vehicle, such as the vehicle 106.

The method of FIG. 3 includes determining 304 whether the first vehicle is the intended recipient of the alert based on the analyzed movement. Continuing the aforementioned example, the communicated alert may or may not be intended for the vehicle 100. All vehicles 100, 102, and 106 may have received a wirelessly-communicated alert from the vehicle 104; however, only one of the vehicles may be the intended recipient. For this reason, the communications manager of each recipient vehicle may analyze the alert to determine whether it is an intended recipient. The communications manager 108 of the vehicle 100 may determine whether the vehicle 100 is an intended recipient based on the analysis of the captured data about movement. For example, the communications manager 108 may determine, based on the movement data, that the vehicles are likely to collide. In this case, the communications manager 108 may determine that the vehicle 100 is an intended recipient.

In another example of determining the vehicle is an intended recipient of an alert communication, the communications manager 108 may determine movement information for vehicles 100, 104, and 106. The communications manager 108 may compare the movement of the vehicle 100 with respect to vehicles 104 and 106. Based on this comparison, the communications manager 108 may determine whether the vehicle 100 is an intended recipient. For example, the vehicle 106 may be positioned move closely to the vehicle 104 than the vehicle 106. For this reason, it can be determined that the vehicle 106 is the intended recipient. In contrast, if the vehicle 100 is positioned more closely to the vehicle 104, the communications manager 108 may determine that the vehicle 100 is the intended recipient.

In yet another example of determining an intended recipient, the communications manager 108 may determine that the vehicle 100 is positioned directly in front of vehicle 104 and stopped, whereas vehicle 106 is positioned behind or to the side of vehicle 104. In this scenario, the communications manager 108 may determine that the vehicle 100 is an intended recipient because it is likely blocking vehicle 104, whereas vehicle 106 is not in a position to block the vehicle 100.

The method of FIG. 3 includes using 304 a user interface of the first vehicle to present notification of the alert in response to determining that the first vehicle is the intended recipient. Continuing the aforementioned example, the communications manager 108 may control the user interface 110 to present notification of the alert in response to determining that vehicle 100 is the intended recipient. For example, the user interface 110 may display a notification and/or sound a notification to indicate the alert. Further, the user interface 100 may display a graphic indicating the vehicle that sent the alert.

In accordance with embodiments, an alert may be communicated based on a behavior associated with one or more of several vehicles. For example, the communications manager 108 of the vehicle 100 shown in FIG. 1 may determine a behavior associated with the vehicle 100 and the vehicle 106. The behavior may be, for example, movement of eyes of a drive of the vehicle 100. For example, a video camera of the vehicle 100 may capture images of the eyes of the operator of the vehicle 100. Further, the communications manager 108 may analyze the behavior. For example, the communications manager 108 may determine whether the operator's eyes are directed towards the position of the vehicle 106. Further, the communications manager 108 may receive user input (e.g., from the user interface 110) for vehicular communication of an alert. Continuing the example, if it is determined that the operator's eyes are directed towards the position of the vehicle 106, an alert may be communicated to the vehicle 106. This is because it may be inferred that the intended recipient is the vehicle to which the operator's eyes are directed. The communication of the alert may be, for example, a wirelessly communicated alert including an instruction for controlling a user interface of the vehicle 106 to present notification of the vehicle 100. In another example, the communication of the alert may be an instruction for controlling a user interface of the vehicle 106 to present an identified and position of the vehicle 100.

In another example of behavior, the behavior may relate to the operation of a vehicle. For example, the communications manager may determine that an automobile is weaving in traffic. In this case, the communications manager may determine that its vehicle is an intended recipient since the vehicle is being driven dangerously, thus it is likely the alert is intended as a warning to the dangerously-drive vehicle.

In an example scenario, the operator of the vehicle 100 shown in FIG. 1 may push the steering wheel mechanism for communicating a notification. This mechanism may be the same or similar to the mechanism that can be used for blowing a vehicle horn. In response to this user input, the communications manager 108 may determine that the vehicle 100 and another vehicle are likely to collide based on their present trajectories. In this case, the communications manager 108 may control the communications module 112 to send an alert to the other vehicle. This communication may be in addition to the vehicle 100 blowing a horn as will be understood by those of skill in the art. In this scenario, the recipient vehicle can hear the horn as well as receive an alert notification by its user interface. The user interface may also present a direction of the communication originator. In another example, the vehicle 100 may generate a voice message that is sent from the vehicle 100 to the other vehicle. Voice recognition may be used to screen objectionable content.

In accordance with embodiments, a user may interact with the user interface 110 to set how notifications of alerts are presented. For example, the user may set the sound level for alerts. In another example, the user may set for a visual indicator of the alert and/or the vehicle originating the alert. Vehicles may be configured with peer-to-peer systems such that vehicle identifiers can also be communicated with alerts.

In accordance with embodiments, a recipient vehicle of a communication may reply to the originating vehicle with an acknowledgement. In this way, the originating vehicle can know that the communication was received. The user interface 110 may present an indication of receipt of the acknowledgement.

Figure 4:
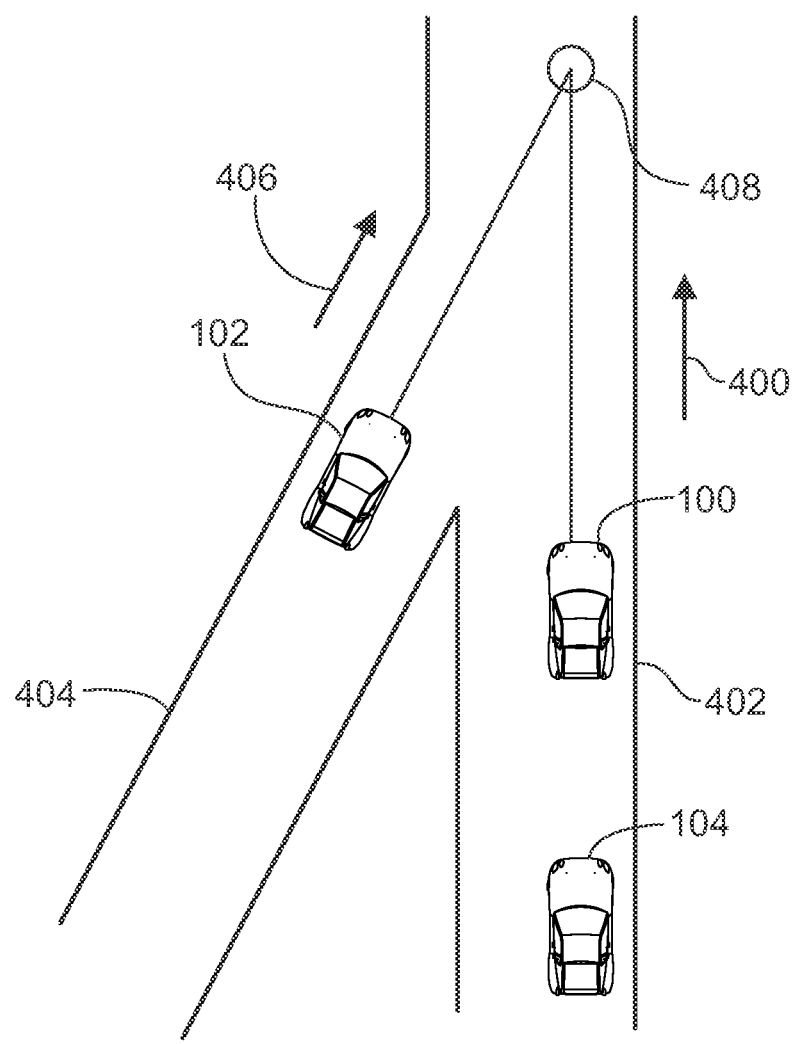
FIG. 4 illustrates a diagram of an overhead view of vehicles driving on roads and operating in accordance with embodiments of the present invention.

FIG. 4 illustrates a diagram of an overhead view of vehicles driving on roads and operating in accordance with embodiments of the present invention. In this example, the vehicles are automobiles. Referring to FIG. 4, vehicles 100 and 104 are driving in the same direction as arrow 400 on the road 402. Vehicle 100 is ahead of vehicle 104. Vehicle 102 is driving on road 404 in the direction of arrow 406. In this scenario, the operator of vehicle 100 may see the vehicle 102 approaching at a high rate of speed and perceive that the vehicles 100 and 102 may collide generally at point 408. Based on this perception, the vehicle 100 operator may depress the horn of the vehicle or otherwise interact with a user interface for communicating an alert. The communications manager of the vehicle 100 may capture movement about the vehicles' movements, analyze the data, and predict the collision of vehicles 100 and 102 based on the present motions. Subsequently and based on the analysis, the vehicle 100 may wirelessly communicate an alert to the vehicle 102. In response to receipt of the alert, the user interface of the vehicle 102 may present the alert to its operator. The following vehicle 104 may not receive the alert, or it may be ignored based on analysis of the movements in accordance with embodiments of the present invention.

In accordance with embodiments, a user may select between a mode of a vehicle operating in accordance with the present subject matter, or a mode in which the vehicle operates its horn normally.

In accordance with embodiments, a mobile computing device may be configured to provide an operator with notification of an alert. For example, a smartphone or tablet computer may be configured to wirelessly receive alerts from nearby vehicles and provide notification of alerts in accordance with embodiments of the present invention.

In accordance with embodiments, predefined areas may be identified as having restrictions about vehicle horns. For example, such areas may not allow horns to be blown. In such scenarios, a vehicle may recognize its position with such an area and disable the normal operation of its horn. Further, the vehicle may enable operation of alert communications in accordance with embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
   at a computing device associated with a first vehicle:
   receiving an alert from a second vehicle;
   analyzing movement of the first vehicle and the second vehicle by determining a location, a speed, and direction of the first vehicle and second vehicle;
   determining a projected point of collision between the first and second vehicle based on the analyzed movement of the first and second vehicle;
   determining whether the first vehicle is an intended recipient of the alert from the second vehicle, based on the analyzed movement and the projected point of collision between the first and second vehicle; and
   in response to determining that the first vehicle is the intended recipient, using a user interface of the first vehicle to present notification of the alert.

2. The method of claim 1, wherein analyzing movement comprises analyzing movement based on the location, speed, and direction of the first vehicle, and the location, speed, and direction of the second vehicle.

3. The method of claim 1, further comprising determining movement of a third vehicle, and
   wherein analyzing movement comprises analyzing movement of the third vehicle.

4. The method of claim 3, wherein analyzing movement of the first vehicle, the second vehicle, and the third vehicle comprises comparing movement of the second vehicle and the third vehicle with respect to the first vehicle.

5. The method of claim 1, wherein using a user interface comprises one of displaying the notification and sounding the notification.

6. An apparatus comprising:
   at least one processor and memory configured to:
   associate with a first vehicle;
   receive an alert from a second vehicle;
   analyze movement of the first vehicle and the second vehicle by determining a location, a speed, and direction of the first vehicle and second vehicle;
   determine a projected point of collision between the first and second vehicle based on the analyzed movement of the first and second vehicle;
   determine whether the first vehicle is an intended recipient of the alert from the second vehicle based on the analyzed movement and projected point of collision between the first and second vehicle; and
   in response to determining that the first vehicle is the intended recipient, use a user interface of the first vehicle to present notification of the alert.

7. The apparatus of claim 6, wherein the processor is further configured to analyze movement based on the location, speed, and direction of the first vehicle, and the location, speed, and direction of the second vehicle.

8. The apparatus of claim 6, wherein the processor is further configured to determine movement of a third vehicle, and analyze movement of the third vehicle.

9. The apparatus of claim 6, wherein the processor is configured to analyze movement of the first vehicle, the second vehicle, and the third vehicle and compare movement of the second vehicle and the third vehicle with respect to the first vehicle.

10. The apparatus of claim 6, wherein the processor is configured to instruct the user interface to display the notification and provide sound to the notification.

\* \* \* \* \*